G. S. TIFFANY.
ELECTRIC FAN AND MOTOR THEREFOR AND FOR OTHER PURPOSES.
APPLICATION FILED OCT. 9, 1911.
1,212,282.
Patented Jan. 16, 1917.
2 SHEETS—SHEET 1.
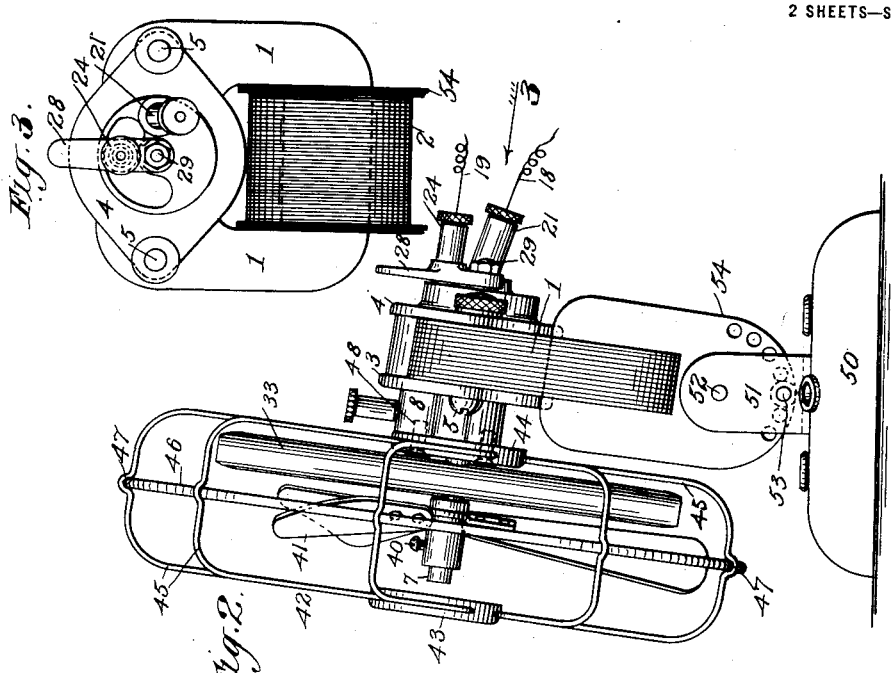
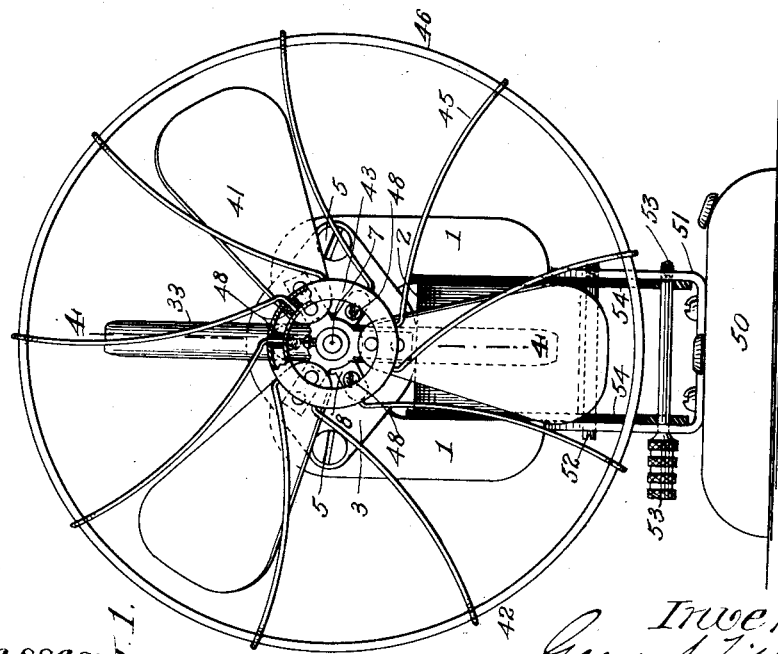

G. S. TIFFANY.
ELECTRIC FAN AND MOTOR THEREFOR AND FOR OTHER PURPOSES.
APPLICATION FILED OCT. 9, 1911.
1,212,282.
Patented Jan. 16, 1917.
2 SHEETS—SHEET 2.
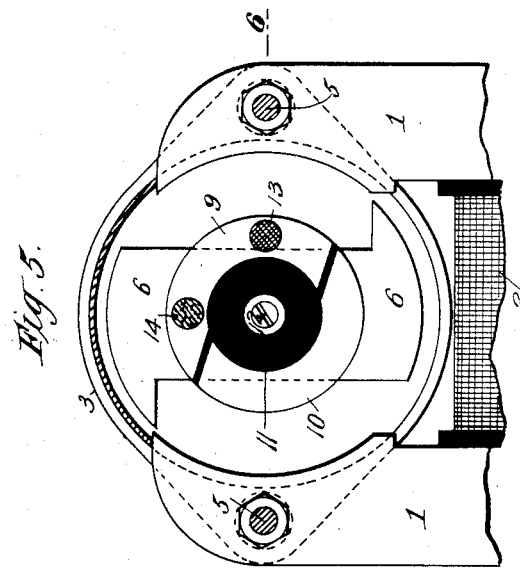
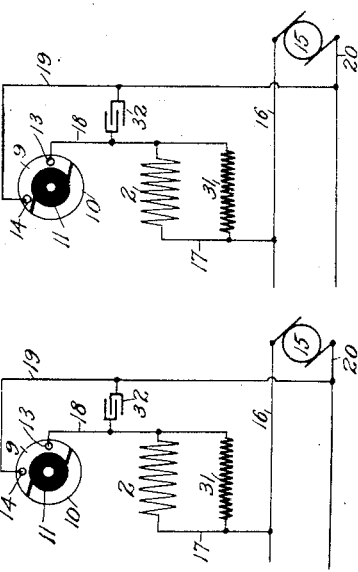
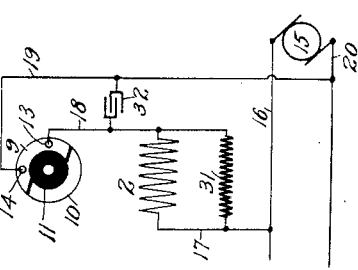
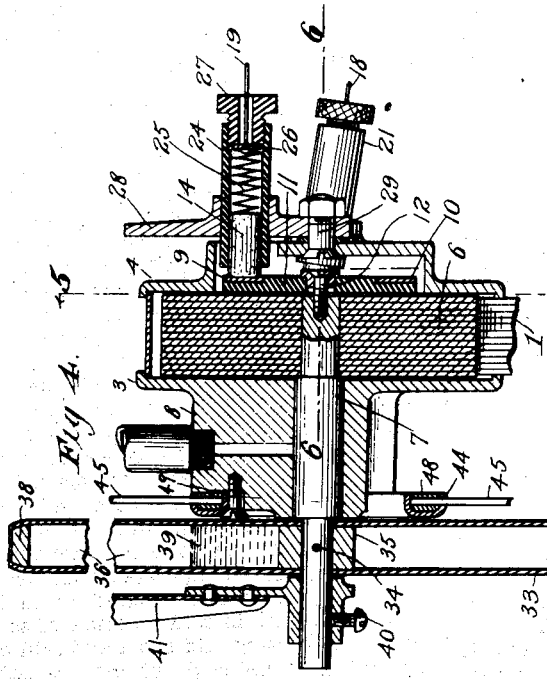
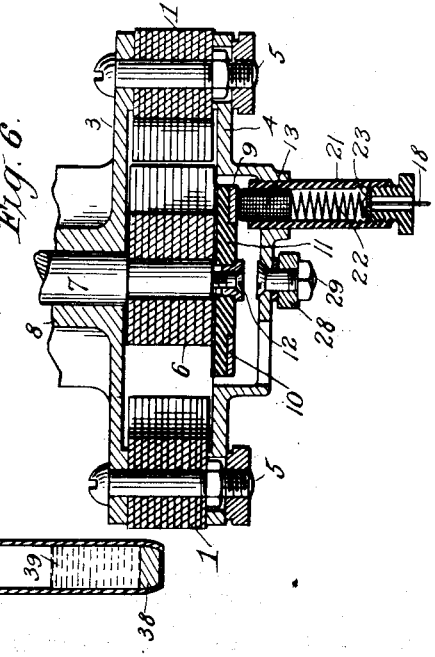
Witnesses:
S. E. Brown
J. F. Kehoe
Inventor:
George S. Tiffany
by his Attys:
Philipp Sawyer Rice & Kennedy

UNITED STATES PATENT OFFICE.

GEORGE S. TIFFANY, OF SUMMIT, NEW JERSEY, ASSIGNOR TO GRAY ELECTRIC COMPANY, OF NEW YORK, N. Y., A CORPORATION OF ILLINOIS.

ELECTRIC FAN AND MOTOR THEREFOR AND FOR OTHER PURPOSES.

1,212,282.   Specification of Letters Patent.   Patented Jan. 16, 1917.

Application filed October 9, 1911. Serial No. 653,510.

*To all whom it may concern:*

Be it known that I, GEORGE S. TIFFANY, a citizen of the United States, residing at Summit, county of Sussex, and State of New Jersey, have invented certain new and useful Improvements in Electric Fans and Motors Therefor and for other Purposes, fully described and represented in the following specification and the accompanying drawings, forming a part of the same.

This invention relates to improvements in electric motors for operating fans and for other purposes; the principal object of the present improvements being to provide a motor which is self starting on the closing of the circuit including it; in which the speed may be varied at will, economically, with respect to the consumption of current; and in which sparking at the brush contacts will be effectively eliminated.

As a full understanding of the improvements constituting the present invention can best be had from a detailed description of an organization embodying the same, such description will now be given in connection with the accompanying drawings, in which—

Figure 1 is a front elevation of a fan and motor therefor embodying the present improvements. Fig. 2 is a side elevation of the same, looking toward the left of Fig. 1. Fig. 3 is a rear view of the same looking toward the left of Fig. 2, showing the motor. Fig. 4 is a vertical sectional elevation of the motor, on an enlarged scale. Fig. 5 is a vertical section on the line 5 of Fig. 4. Fig. 6 is a horizontal section on the line 6 of Figs. 4 and 5; and Figs. 7 and 8 are diagrammatic views illustrating the electric circuit for the motor.

Referring to said drawings the motor will first be described. The magnet 1 of the motor is constructed preferably of soft steel laminations having a magnetizing winding 2; said laminations being clamped together by yokes 3, 4, provided with bolts 5, passing therethrough and through suitable openings in said laminations. The rotary armature 6 of the motor is of approximately S shape, conforming peripherally to the arc shape of the opposed poles of the magnet. This armature 6, which is also preferably formed of soft steel laminations, is fixed to a shaft 7 rotating in a bearing 8 fixed to or forming part of the yoke 3; this bearing and yoke 3 being so positioned as to support the shaft 7 and armature 6 in proper relation to the poles of the magnet 1. Shaft 7 and armature 6 also carry a commutator consisting of two arc shaped metal plates 9, 10, secured to a disk 11 of insulating material, which is, in turn, secured by a screw 12 to the inner end of shaft 7, as best shown in Figs. 4, 6. The metal plates 9, 10, of the commutator rotate with shaft 7 and armature 6, and as so rotated, are engaged by a pair of brushes 13, 14, connected, as shown in Figs. 7 and 8, with a source 15 of electric energy, such connections consisting of wires 16, 17, winding 2 of magnet 1, wire 18, contact brush 13, plate 9 (or 10, according to the position of the commutator), contact brush 14, wire 19, and wire 20 to the source 15 of electric energy.

Brush 13, which is preferably of woven wire, is suitably mounted in a tube 21 of insulating material, secured in a suitable opening in yoke 4, and it is held yieldingly in engagement with the commutator by a spring 22 in said tube in rear of said contact brush, a metal washer 23 connected with said spring (and to which circuit wire 18 is connected) and a screw plug of insulating material which is threaded in the outer end of the tube 21. Contact brush 14, which, however, is preferably of graphite, is also contained in a tube 24 of insulating material, and is held yieldingly in engagement with the commutator by means of a spring 25, metal washer 26 connected therewith, and to which circuit wire 19 is connected, and a screw threaded plug 27 of insulating material in the outer end of said tube 24. Contact brush 14, however, is adjustable to and from contact brush 13, and to provide for this adjustment the tube 24 containing this contact brush is mounted in an arm 28 which, in turn, is pivotally mounted on a stud 29 secured to the yoke 4, in axial alinement with shaft 7, so that said arm 28 may be swung concentrically to said shaft and its contact brush 14, thereby adjusting it to and from contact brush 13 in the path of movement of the commutator plates 9, 10. Contact brush 14 and the arm 28 in which it is mounted also constitute the circuit controlling means by which the motor circuit is opened and closed to start and stop the motor, and also to regulate its speed; the circuit being opened by moving contact brush 14

14 from contact with the commutator plate 9 or 10, as the case may be, with which contact brush 13 may at the time be in contact, and the circuit being closed by moving said brush 14 into contact with the commutator plate 9 or 10, as the case may be, with which brush 13 may at the time be in contact; the speed of the motor being also regulated by moving the brush 14 to and from brush 13. Upon the movement of the arm 28 to the position in which it is shown in Figs. 3 and 4, the circuit from the source 15 of electric energy will be closed through magnet 1, and the latter thus be energized, with the result that the armature 6 and the commutator will be rotated in a counterclockwise direction. As the armature 6 is thus rotated, the commutator plate 9 will move out of contact with brush 13, thus breaking the motor circuit at this point. The momentum of the armature 6, however, will cause it to continue to rotate and thus bring commutator plate 10 into engagement first with contact brush 13, and then with contact brush 14, which then again closes the circuit, reestablishing the motor circuit and energizing the magnet 1, which will act upon armature 6 to give it additional impetus, causing it to accelerate its speed, and so on.

To relieve the insulation of the motor from the strain resulting from the current discharges of the winding 2 of magnet 1, a high resistance shunt 31 is bridged around the winding 2, as shown in Figs. 7 and 8.

In motors as heretofore constructed, when contact between the brush 13 and the commutator plates 9 and 10 is broken, sparking results, which is, of course, objectionable for reasons that need not be stated. This sparking is avoided in the present case by the provision of a condenser 32 bridged across the contacts 13, 14, between the wires 19, 19, as shown in Figs. 7 and 8, which condenser momentarily offers a path for the current immediately after the circuit is thus broken.

I prefer graphite for the contact brush 14 and metal for the contact brush 13 for the reason that by the use of a graphite brush for closing the circuit, and a metal brush for breaking the circuit, there is less tendency for the discharge from the condenser 32 to injure the commutator plates 9, 10, with such an arrangement of contact brushes than otherwise, and, furthermore, the graphite also acts as a lubricant.

The object in providing for the relative movement above referred to of the commutator brushes 13, 14, or, in other words, the adjustment of commutator brush 14 to and from commutator brush 13, is not only to stop and start the motor but also, as before indicated, to vary, as desired, the duration of the current impulses passing through the motor circuits from the source of electric energy 15, the duration of such current impulses being increased as the brush 14 is adjusted toward brush 13, and correspondingly decreased as it is adjusted away from the brush 13. For example, if the brush 14 be adjusted from the position in which it is shown in Fig. 7 to the position in which it is shown in Fig. 8, the duration of such current impulses will be shortened, as in such case a short angular movement of the commutator 6 will cause the plate 9 to pass out of contact with the brush 13. This shortening of the current impulses will cause a diminution of the mean strength of the currents passing through the motor circuits, and will consequently slow down the motor. This method of varying the speed is much more economical of current consumption than the usual method of interposing more or less resistance into the circuit, as in the present method all of the current is consumed in the motor, while in the other method more or less current is wasted in the external resistance. Shaft 7 is also provided with an overbalancing device, the purpose of which is, when the motor slows down in stopping, to cause the armature 6 to stop in such a position with relation to the poles of the magnet 1 that when said magnet is again energized by the closing of the motor circuit, said armature will at once begin to rotate in the right direction, as will presently more fully appear. The specific form of device provided for this purpose by the present invention, and which embodies this feature of the invention in its preferred form, consists of a tube 33 secured to the outer end of shaft 7 by means of a pin 34 passing through the middle of the tube 33; this pin also securing to the shaft a plug 35 of suitable material, tightly fitting said tube so as to divide it into two chambers 36, 37, of equal length, the outer end of each chamber 36, 37 being also sealed by a plug 38. Each of the chambers 36, 37 is supplied with a quantity of mobile material 39, preferably mercury, the amount in each being the same. Normally, the tube 33 will occupy the perpendicular position in which it is shown in Fig. 3; the mercury in chamber 36 or 37 as the case may be, because of its location in the lower end thereof, overbalancing the mercury in the other chamber, and thereby causing the armature 6 to assume the position in which it is shown, in which position, it will be observed, the points of the armature are in a position to be attracted more strongly by the poles of the magnet 1 than are the flat backs of the armature, so that, immediately upon the closing of the motor circuit by the movement of contact 14, as before described, the armature will begin to rotate in the direction of the arrow, Fig. 2. As it rotates, the mercury in the chamber 36 or 37 (whichever happens to be uppermost at the time of starting) will, because of the centrifugal force set up by the rotation of the tube, move to the outer end of its chamber, and thus balance the effect of the mercury in the other chamber. Upon opening the circuit and allowing the motor to slow down, one or the other of the tubes 36, 37 will be lowermost, with the result that the mercury in the uppermost one will move readily toward the axis of the shaft 7, and the mercury in the lowermost one will move to the lower or outer end of said chamber, and thus overbalance the mercury in the uppermost chamber and cause the armature 6 to again assume the position in which it is illustrated in Figs. 2 and 3.

Another valuable feature of the motor above described, in addition to those heretofore referred to, is that it will operate efficiently upon alternating current, as there are no windings on the armature to set up complex phase relations in the currents.

The motor shaft 7 has fixed to its front end by set screw 40 (see Fig. 4) a fan 41, which is inclosed by a suitable wire guard or cage 42 of simple, cheap, and at the same time durable construction. This guard or cage consists of a pair of central tubular rings 43, 44, on opposite sides of the fan 41; a series of spring wires 45, connected at their ends with rings 43, 44, and suitably bowed lengthwise, as shown in Figs. 1 and 2, to inclose the blades of the fan; and a strengthening wire ring 46 sprung into recesses 47 formed in the wires 45 midway of their lengths (see Fig. 2). The wires 45 are connected with the tubular rings 43, 44, by means of plugs 48 of solder in the rings (Fig. 1), in which the ends of the wires 45, passed through suitable peripheral openings in the rings, are embedded. The guard or cage is connected with the motor frame through the ring 44, which, as will be observed, on reference to Fig. 4, rests, at its upper portion, in a suitable recess formed in the bearing 8 of the frame, and is secured to the frame by screws 49 (Figs. 1 and 4). The wires 45 instead of extending in radial lines from the rings 43, 44, extend in lines tangential thereto or, in other words, are bent away from radial position. This gives them a certain amount of resiliency so that they will firmly grip the stiffening ring 46 sprung into the recesses 47, thus rendering it unnecessary to secure them to wire 46, as by solder; a very rigid guard being thus secured and one which is light and durable and also cheap to manufacture, both in cost of materials and labor.

The fan and motor are adjustably mounted on a pedestal 50 through which the circuit connections from the source 15 of electric energy may be passed. The adjustable connection of the fan and motor is secured by providing pedestal 50 with an upwardly extending yoke shaped bracket 51, in which the motor is pivotally mounted, as at 52, bracket 51 being provided with an opening and a pin 53 passing therethrough and any one of a set of openings in the magnet heads 54 according to the inclination to which the fan and motor may be adjusted.

What I claim is:—

1. The combination with an electric motor and circuit controlling means for alternately making and breaking the motor circuit as the motor operates, of spark-annulling means affording a path for the extra current as the motor circuit is thus broken, a circuit controlling means for alternately making and breaking the motor circuit as the motor operates, comprising a circuit-closing contact of carbon and a circuit breaker of metal, substantially as described.

2. The combination with an electric motor, of a circuit interrupter having a circuit closing contact and a separate circuit breaking contact, for making and breaking the motor circuit, means for annuling the spark at the breaking of the circuit by said interrupter, and means for varying the relative duration of the open and closed circuit periods of the motor circuits by varying the relative positions of said circuit closing contact and said circuit breaking contact.

3. The combination with an electric motor, of circuit controlling means for alternately making and breaking the motor circuit as the motor operates, comprising a circuit closing contact and a circuit breaking contact one adjustable relatively to the other to vary the time of contact controlling the interrupted currents for operating said motor and thus varying the speed of the motor, substantially as described.

4. The combination with an electric motor and a rotary circuit breaker therefor, of circuit controlling means for alternately making and breaking the circuit as the motor operates, comprising a circuit closing contact and a circuit breaking contact both engaging the breaker as it rotates and one adjustable relatively to the other to vary the time of contact controlling the interrupted currents for operating said motor and thus varying the speed of the motor, substantially as described.

5. The combination with an electric motor and its rotating armature of means including a centrifugally movable weight for automatically positioning the armature in an unbalanced magnetic relation to the magnet as the motor circuit is broken and the armature comes to rest, whereby the motor becomes self starting on the closing of the circuit.

6. The combination with an electric motor and its rotating armature, of means for automatically positioning the latter in an unbalanced magnetic relation to the magnet as the motor circuit is broken and the armature comes to rest, whereby the motor becomes self-starting on the closing of the circuit, said positioning means comprising two chambers on opposite sides of the armature shaft each containing means movable longitudinally of the chamber to and from the armature shaft, substantially as described.

In testimony whereof, I have hereunto set my hand, in the presence of two subscribing witnesses.

GEORGE S. TIFFANY.

Witnesses:
 I. WHITE,
 S. E. BROWN.